Feb. 24, 1942.   R. R. SMITH   2,274,306
FRUIT JUICING APPARATUS
Filed March 7, 1939   3 Sheets-Sheet 1
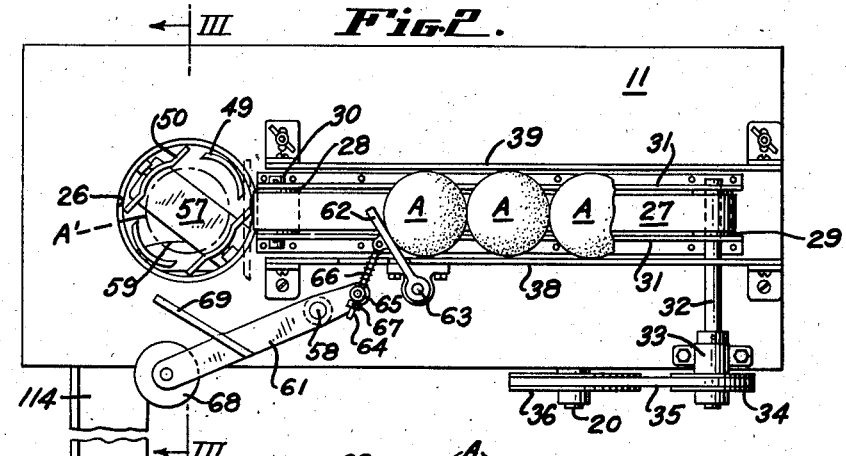
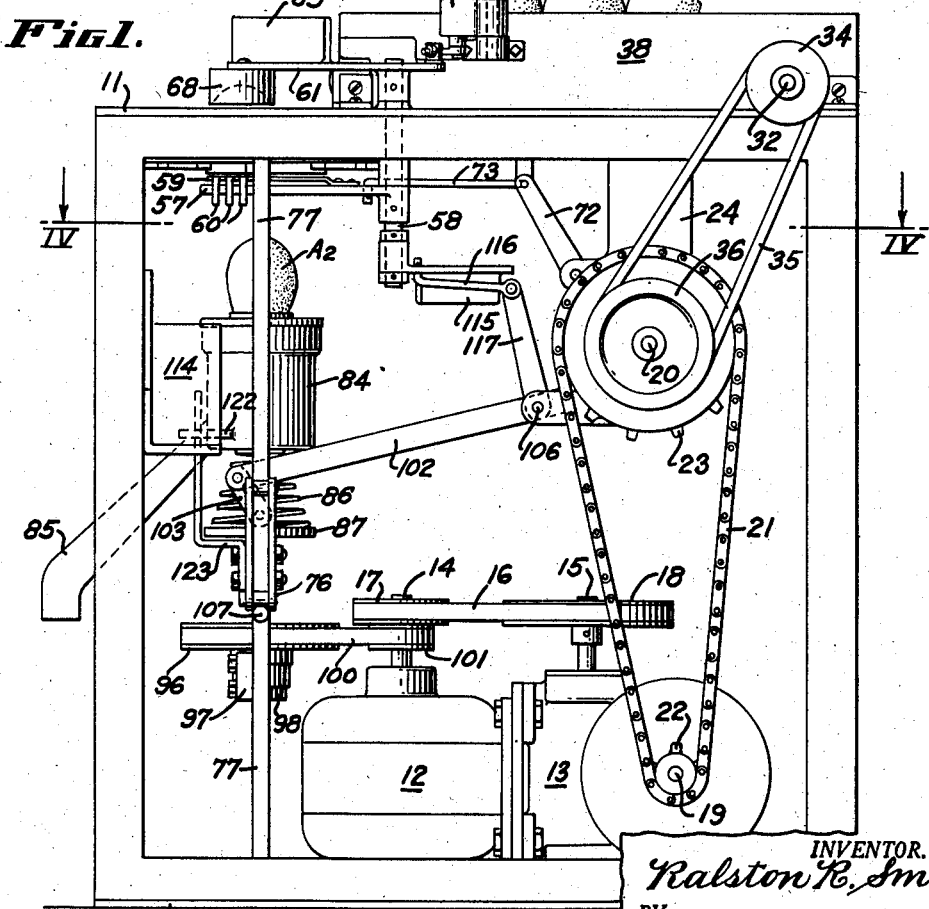
INVENTOR.
Ralston R. Smith
BY Oscar A. Mellin
ATTORNEY.

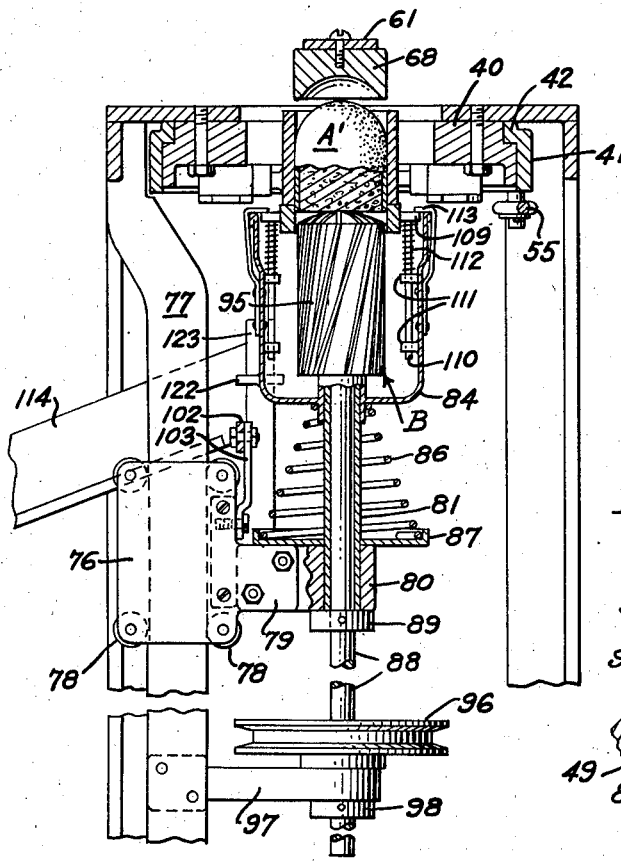
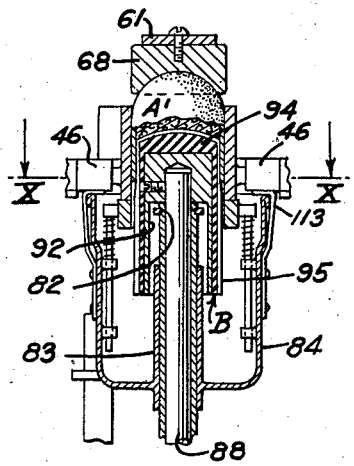
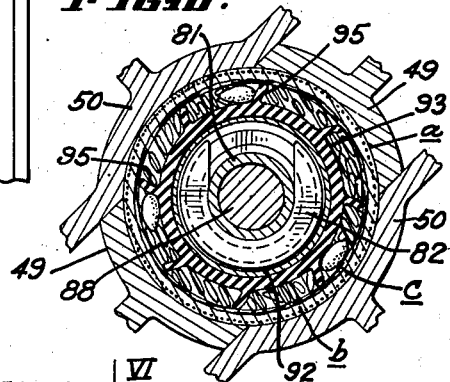
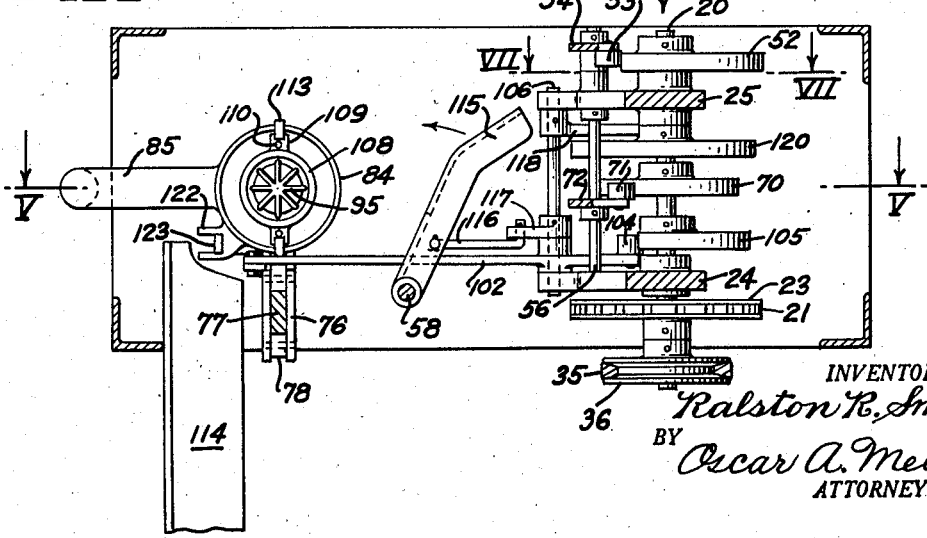

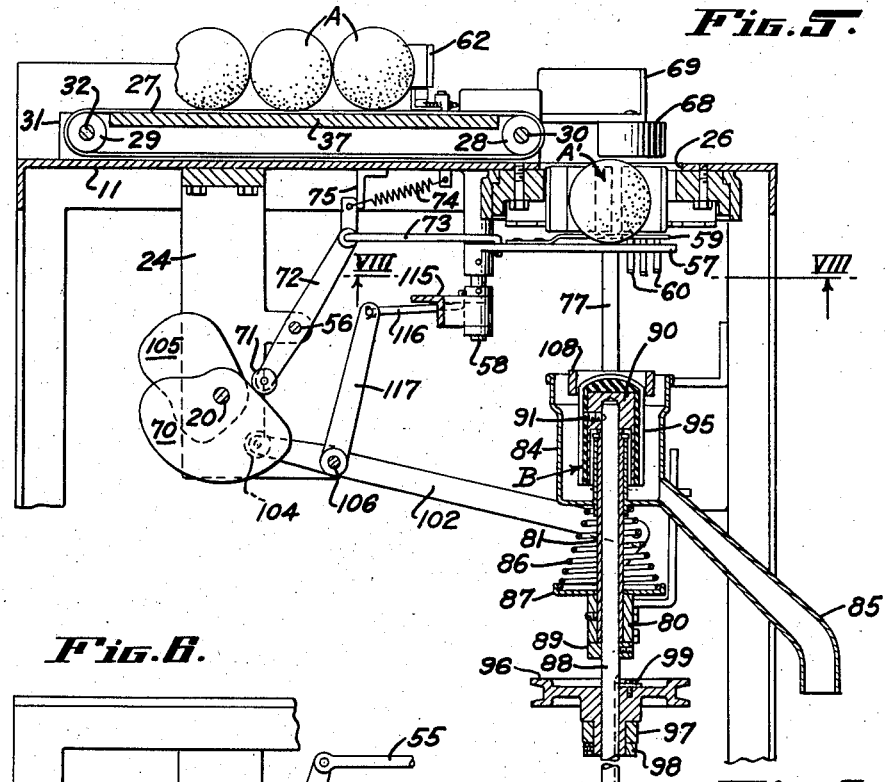

Patented Feb. 24, 1942

2,274,306

UNITED STATES PATENT OFFICE 2,274,306

FRUIT JUICING APPARATUS

Ralston R. Smith, Vallejo, Calif.

Application March 7, 1939, Serial No. 260,347

13 Claims. (Cl. 146—3)

This invention relates generally to the extracting of juices from fruits and is more particularly directed to an improved apparatus especially adaptable for the extracting of juices from citrus fruits without objectionable modification of their natural color, flavor, and aroma.

It is the principal object of the present invention to provide an apparatus for efficiently extracting the juice from citrus fruit with a minimum degree of aeration and with a minimum contamination thereof with undesirable constituents present in the rind and in the tissues surrounding the juice cells or sacs and with a maximum retention of those substances responsible for the natural color, flavor, and aroma of the juice and for its nutritive value.

In citrus fruits, the juice is present in small multicellular, spindle or club-shaped juice sacs which completely fill the segments or carpels of the fruit that are distributed about the soft pithy core. Each segment is surrounded by a carpellary membrane and closely adherent to the outer carpellary membrance of the several segments we find the vascular elements. The surrounding rind or peel consists of an inner, white, spongy portion, the albedo, and an outer colored portion, the flavedo which contains the oil glands, the peel oil being present in balloon-shaped cells which are more or less easily broken and consisting largely of terpenes and of citral which are mainly responsible for its strong acid flavor.

Substances responsible for the development of bitterness in the extracted juice are located chiefly in the carpellary membranes, the vascular elements, and the inner peel, as well as in the seeds which contain intensely bitter elements; pectic substances and pectic enzymes being present largely in the inner peel together with the oxidizing enzyme, peroxidase, which is also present to a marked degree in the vascular elements.

While it is obvious that a rupturing of the carpellary membrane enclosing the segments or carpels is necessary for the extraction of juice contained in the 'uice sacs, it will be evident that it is highly undesirable to produce an excessive shredding and grinding of such membrane and adjacent vascular elements or a squeezing thereof such as would release into the fruit juice an appreciable amount of the undesirable "rag-juice"; that is, the bitter juices contained in the carpellary membranes and pith. It will also be evident that any pressure tending to squeeze citrus oil from the rind should not be employed.

Citrus fruit juices, particularly orange juice intended for beverage purposes, is generally marketed in the cloudy condition in order to retain the natural color, flavor, and aroma of the fresh fruit juice, which are to a large extent due to the suspended finely divided particles, chromatophores, present in the juice sacs and containing the carotinoid pigments that give the juice its orange color and much of its flavor and aroma, and since orange juice cleared of these desirable constituents would be straw yellow in color, rather insipid in flavor, and lacking in fruity aroma, the apparatus to be employed should be capable of extracting the fruit juice in a manner promoting a minimum contamination thereof by those agencies responsible for bitterness and a maximum retention therein of the elements promoting the desired color, flavor, and aroma.

Second only to the retention of color, flavor and aroma is the retention of nutritive elements such as the highly beneficial fruit acids, sugars, and mineral salts which are not usually affected by the extraction, and the water-soluble vitamins, such as vitamin C which is subject to destruction by oxidation.

Fruit juices in general, and citrus juices in particular, deteriorate in color, flavor, and much of their fresh aroma on exposure to air, and suffer an appreciable loss in nutritive value due to the destruction of vitamin C by oxidation.

Because of the presence of air in the intercellular spaces of the fruit and because of the difficulty of extracting the juice without some aeration, extraction should be conducted under conditions which minimize the amount of air incorporated into the juice through the juicing operation.

In the most commonly used method for extracting juice from citrus fruits, the whole fruit is cut in half at right angles to the axis of growth, and the juice is extracted by pressing the halved fruit against a revolving conical ribbed or grooved extractor or burr with a resulting pressing and tearing action which incorporates appreciable amounts of air, oil, and undesirable tissue into the product, as well as the intensely bitter elements released by the seeds which are cut during the halving of the fruit. The higher the speed at which the burr revolves, the greater is the tearing and the less is the pressure; this resulting in a lower contamination of the juice with oil from the peel but more aeration and more contamination with other tissues, the reverse being true at low speeds and greater pressure.

It is recognized that orange juice intended for beverage purposes must not contain an appreciable amount of rind oil or other bitter elements. Consequently, in order to keep down the degree of contamination of the expressed fruit juice by oil pressed from the rind, at the expense of greater aeration, the pressure burr machines usually employed are of the high speed type in which the burr revolves at a speed which produces aeration to a degree rendering the expressed juice subject to rapid deterioration, particularly the destruction by oxidation of the beneficial vitamins. For this reason it has become a general practice to retail pure orange juice for immediate consumption in establishments employing relatively small high speed hand-fed burring machines which will quickly express the orange juice from halved fruit as needed.

The practice of crushing and pressing the whole fruit, commonly used in by-product plants for the recovery of oil, citric acid and pectin, is not desirable for producing beverage juices, even when the juice is centrifuged to remove the oil.

Various other methods have heretofore been practiced in which the extraction is accomplished, almost without exception, by maceration of the tissues and by the application of a squeezing pressure. Such methods which depend upon applied pressure are not satisfactory for the reason that the squeezing action does express from the tissues and peel the "rag-juices" and citrus oil which constitute the elements mainly responsible for undesirable qualities in the produced fruit juice.

In its preferred embodiment, my invention contemplates holding the whole fruit against rotation in a manner to slightly elongate the fruit to a cylindrical form providing parallel side walls; slicing a spherical segment from an end of the elongated fruit to avoid cutting the seeds, to expose only a relatively small area of the cut pulp to the deteriorating action of the air, and to permit direct access to the interior of the fruit; and advancing into the pulp body a rotating element adapted to rupture the carpellary membranes and juice sacs to release the fruit juice, said rotating element being of such relatively soft and pliable character and of such size and shape as to function in the manner of a squilgee to produce only a relatively soft rubbing action against the interior of the inner rind and adjacent carpellary membranes and no squeezing pressure of a degree sufficient to press oil from the fruit rind or an appreciable amount of "rag-juice" from the interior tissues, said element being rotated at a speed below that which would produce undesirable aeration of the fruit juice.

The invention is exemplified in the following description and illustrated by way of example in the accompanying drawings, in which:

Fig. 1 is a side elevation of my improved apparatus.

Fig. 2 is a top plan view thereof.

Fig. 3 is an enlarged partial section taken on the line III—III of Fig. 2, but differing therefrom in that the parts are shown in the positions they assume just prior to the actual juice extracting operation.

Fig. 4 is a plan section taken on the line IV—IV of Fig. 1, the drive mechanism being eliminated from this view so as to show more clearly the parts associated with the cam shaft.

Fig. 5 is a partial vertical section taken on the line V—V of Fig. 4.

Fig. 6 is a detail elevation looking in the direction of the arrow VI in Fig. 4.

Fig. 7 is a detail section taken on the line VII—VII of Fig. 4.

Fig. 8 is an enlarged plan view of the front portion of the apparatus taken on the line VIII—VIII of Fig. 5 and looking upward towards the underside of the top plate of the framework thereof.

Fig. 9 is a sectional view similar to the medial portion of Fig. 3, but showing the orange in an elevated position it assumes during the juicing operation.

Fig. 10 is an enlarged section taken on the line X—X of Fig. 9.

Referring more specifically to Figs. 1 to 8 of the drawings, it will be noted that I have provided a supporting framework comprising a base plate 10 and a top plate 11 vertically spaced therefrom and supported thereon by four corner legs, all of which may be welded or otherwise secured together and suitably reenforced to provide a substantial rigid structure.

Preferably there is mounted on the base plate 10 an electric motor 12 and associated speed reduction unit 13 of any standard type suitable for driving the apparatus in the required manner, although it will be obvious that the apparatus may be driven from any other available source of power. The motor shaft 14 is in driving connection with the driven shaft 15 of the reduction unit 13 through an endless belt 16 engaging belt pulleys 17 and 18 fixed to the respective shafts. The drive shaft 19, which is driven by the motor through the reduction unit at a relatively slow speed, is in driving connection with a cam shaft 20 through an endless chain 21 engaging sprockets 22 and 23 fixed, respectively, to said drive shaft 19 and said cam shaft 20, which cam shaft is journaled in a pair of transversely spaced brackets 24 and 25 depending from and secured to the under surface of the top plate 11.

Near the front of the machine, the top plate 11 is provided with a circular fruit receiving aperture 26 and aligned with this aperture and mounted upon said top plate 11 to extend rearwardly along the medial portion thereof is a fruit feeding mechanism which functions to convey fruit to said aperture and drop the fruit one at a time therein to be operated upon by the juicing mechanism, as will later be described. This feeding mechanism includes a horizontally disposed endless conveyer belt 27 rove about a forward idler roller 28 and about a rear driven roller 29, the idler roller 28 being journaled on a shaft 30 carried by the forward ends of opposed elongated upright brackets 31 between which said belt is disposed, and the driven roller 29 being fixed on a conveyer drive shaft 32 which is journaled in said brackets 31 and in a pillow block 33. Outside the pillow block 33 there is secured to the shaft 32 a belt pulley 34 which is driven by a belt 35 engaging a belt pulley 36 secured to the outer end of the cam shaft 20, as shown in Figs. 1 and 2. A horizontal table plate 37 supported by the brackets 31 is disposed between the two rollers 28 and 29 and between the opposed flights of the conveyer belt in position to contact and support the upper flight and its load.

Disposed on opposite sides of the conveyer belt 27 I provide upright elongated guide plates, the plate 38 being fixed and the plate 39 being secured in place upon the top plate 11 by adjustable means whereby the transverse distance between the two guide plates may be varied to accommodate fruit of different diameter. Thus, the conveyer is adapted to convey fruit, graded as to size, which may be deposited thereon manually, or automatically from a hopper or by any other desired means.

Since there is a certain dependent relationship between the operations and relative timing of the feed control means and the juicing mechanism, it is believed desirable to first describe said mechanism before proceeding with a detail description of said feed control, and while the apparatus is adaptable for the juicing of various citrus fruits, I will hereinafter refer more particularly to its use for the purpose of juicing oranges.

Secured to the underside of the top plate 11 concentric with the fruit receiving aperture 26 is an annular track member 40 and surrounding this track member is a cam ring 41 having an internal flange 42 engaged in an annular groove formed in the member 40, the cam ring thus being mounted for oscillation in relation to the stationary track member.

As shown in Fig. 8, the cam ring 41 is, at 90° intervals, notched and formed to provide angled cams 43, and is yieldingly maintained in normal position by a spring 44. Mounted in slideways 45 formed on the lower surface of the track member 40 are four horizontal plungers 46 arranged at 90° intervals about the center of the fruit receiving aperture for radial reciprocation in relation to said center, each of said plungers having at its outer end an anti-friction roller 47 normally disposed in the path of the respective cam 43 of the oscillatory cam ring 41. Each of said plungers has detachably secured in its inner end the shank 48 of a fruit gripping member, the two opposed gripping members 49 each providing a vertical wall which is arcuate in horizontal cross-section, and the two opposed gripping members 50 each providing a vertical wall disposed at right angles to the associated plunger and having a medial arcuate portion of the same curvature as the arcuate gripping members 49 so that when the four gripping members are brought together, they form a vertical hollow open-ended cylinder surrounding the orange. The several gripping members are disposed within the fruit receiving aperture 26 and extend downwardly from the top plate 11 a distance somewhat less than the height of the orange so that a portion of an orange held between said members will extend below the lower edges thereof, and each of said members and its associated plunger, as a unit, is normally yieldingly held in retracted position by a spring 51, as shown in Fig. 8. It will of course be obvious in conditioning the apparatus for handling oranges graded to other sizes, that the detachable gripping members 49 and 50 will be replaced by others of the appropriate size and radius of curvature.

To oscillate the cam ring 41, I provide a cam 52 secured on the cam shaft 20 in position to engage a roller 53 carried by the lower end of a rocker arm 54 whose upper end is pivotally connected to the cam ring through a connecting link 55 (as shown in Figs. 6 and 8), said rocker arm being loosely mounted on a pivot rod 56 journaled in the two depending brackets 24 and 25, as shown in Fig. 4. From an examination of Fig. 8, it will be noted that normally the cams 43 are so disposed in relation to the adjacent rollers 47 that oscillation of the cam ring, in the direction of the arrow in said Fig. 8, will cause the gripping members 50 to approach each other before similar movement of the gripping members 49 is effected.

An orange brought to the receiving aperture 26 drops through said aperture between the normally open gripping members and onto a horizontal stop arm 57 which is positioned below the gripping members and normally extends across the vertical center of the fruit path. The stop arm 57 is secured to a vertical shaft 58 and is provided with a horizontal knife blade 59 which is disposed immediately below the bottom edges of the gripping members in position to slice a spherical segment from the bottom portion of an orange held stationary by the gripping means, the knife blade being provided with a series of prongs 60 extending from its rear edge and bent downwardly and forwardly towards its cutting edge in a manner to engage and eject the spherical segment sliced from the orange by the knife.

The actuation of the shaft 58 also controls the feeding of the fruit to the juicing mechanism, and its upper end above the top plate 11 has secured thereto a control lever 61 disposed at one side of the forward end of the conveyer, as shown in Figs. 1 and 2. A trip finger 62 is pivoted at 63 and normally projects above the conveyer in the path of the oranges A and is connected to the rear end of the control lever 61 by a rod 64 pivoted to said finger and slidably extending through a bore formed in a stud 65 which is journaled on said lever, there being a coil spring 66 surrounding said rod between the trip finger and said stud and an abutment collar 67 fixed on the free end of said rod in position to engage said stud.

The forward end of the lever 61 has secured thereto a circular cap member 68, the lower surface of which is disposed closely adjacent the upper surface of the top plate 11 and is concaved to receive the upper end of an orange engaged by the fruit gripping means, said lever also being provided with an upright stop flange 69.

The means employed for oscillating the vertical shaft 58 comprises a cam 70 secured on the cam shaft 20 in position to engage a roller 71 carried on the lower end of a rocker arm 72 whose upper end portion is pivotally connected to the arm 57 by a connecting link 73 (see Figs. 5 and 8), said rocker arm 72 being secured to the rod 56 with its upper end yieldingly held by a spring 74 in contact with a stop member 75 depending from the top plate 11.

The mechanisms thus far described function in relatively timed sequence to deposit the oranges one at a time at a juicing station, to condition the orange for the juicing operation and to hold the orange against rotation throughout said juicing operation.

With a row of oranges A having been fed along the conveyer until arrested by the trip finger 62 (as shown in Fig. 2) and assuming that an orange A' has been deposited through the fruit receiving aperture 26 to rest upon the stop arm 57 between the gripping members 49 and 50 (as shown in Fig. 5 and as indicated by a dotted circle in Fig. 2), the described mechanism will function in the following manner.

As the cam shaft 20 is rotated, the cam ring 41 will start its oscillation (in the direction of the arrow in Fig. 8), first to cam the opposed gripping members 50 towards each other to engage opposite sides of the orange and to close the gaps between the several gripping members, and then to cam the opposed gripping members 49 inwardly to engage the orange, the four gripping members thus surrounding and gripping the orange with sufficient force to slightly elongate the orange and to prevent its rotation during the juicing operation.

The cam 70 will at this time engage the roller 71 to actuate the rocker arm 72 and through the connecting link 73 oscillate the stop arm 57 and the knife 59, and also the vertical shaft 58 to which the arm 57 is secured. This horizontal oscillation of the knife 59 across the vertical axis of the orange will slice from its lower end a spherical segment which will be engaged and ejected by the prongs 60.

Concurrently with such slicing operation, the oscillation of the vertical shaft 58 will oscillate the feed control lever 61 to bring the cap member 68 over the fruit receiving aperture 26 in vertical alignment with the gripped orange A' (as shown in Fig. 3) and to position the upright stop flange 69 across the forward end of the conveyer (as indicated by dotted lines in Fig. 2). With this movement of the lever 61, the trip finger 62 will be rocked outwardly to release the lead orange A which will be carried forward by the conveyer belt until it is arrested by engagement with the stop flange 69, said trip finger being positioned so that, upon its subsequent release by normalizing movement of the lever 61, it will engage the next succeeding orange, this arrangement providing an automatic unit feed of oranges to the juicing mechanism.

The juicing mechanism is disposed below the top plate 11 in vertical axial alignment with the fruit receiving aperture 26 and is carried by an elevator 76 arranged for vertical reciprocation on a vertically disposed track 77 which is of rectangular cross-section and extends between and is rigidly connected to the base plate 10 and the top plate 11. This elevator slidably embraces the track 77 and is provided with anti-friction rollers 78 arranged in pairs to engage the opposed edges thereof and with lateral ears 79 between which is removably bolted a lateral arm 80 (see Figs. 1 and 3).

In the lateral arm 80 of the elevator 76 is secured the lower end of an upright tube 81 having an external annular groove near its upper end adapted to receive a clevis stop ring 82 (see Fig. 10). Slidable on said tube is the tubular core 83 of a juice receiving cup 84 which is provided with a discharge spout 85 to discharge the extruded fruit juice into a suitable receptacle.

The cup 84 rests upon a coil spring 86 which surrounds the elevator tube 81 and seats upon a cupped disc 87 engaging the lateral arm 80 of the elevator, said spring exerting its tension to normally maintain the cup 84 in its uppermost position in relation to the tube 81 with the upper end of its tubular core 83 engaged against the stop ring 82.

Rotatably journaled within the tube 81 is a rotary reamer shaft 88 which has fixed thereon a collar 89 engaging the lower surface of the arm 80 of the elevator, and disposed within the cup 84 is a juicing reamer B. This reamer is preferably formed to provide a cylindrical metal core having a head portion 90 secured by a set screw 91 to the upper end of the reamer shaft 88 to normally abut against the upper end of the tube 81, and a depending tubular skirt portion 92 which surrounds the tubular core 83 of the cup 84, as shown in Fig. 5. Secured to this metal core by cement or other suitable means or by being vulcanized thereto is an outer covering providing a vertical cylindrical wall 93 and a slightly convex top wall 94, these walls being provided with outwardly projecting radial ribs 95 circularly spaced around the cylindrical wall 93 and extending lengthwise thereof and slightly spiraled in the direction of rotation and continuing across the top wall 94 to meet at the axial center of the reamer. It is especially desirable that the ribs 95 project outwardly to provide intermediate flutes of sufficient depth to receive therein the seeds of the fruit (as shown in Fig. 10), and that they be of a relatively soft and somewhat flexible character so as not to break the seeds and release their bitter elements and in order that, in their reaming action, they may flex rearwardly in relation to the direction of rotation of the reamer and function in the manner of squilgees to produce a relatively soft rubbing action as distinguished from a harsh grinding action such as would produce excessive maceration of the fruit tissue, particularly the carpellary membrane and pith, and an excessive squeezing of such tissue and the fruit rind. To this end I prefer to form the walls 93 and 94 of the reamer and the ribs 95 thereof of relatively soft flexible material such as rubber, although other materials having similar characteristics may be employed.

The reamer shaft 88 extends downwardly through a belt pulley 96 which is journaled in a stationary bracket 97 extended laterally from the lower portion of the track bar 77 and which is retained against vertical movement by a shoulder engaging the upper surface of said bracket and by a collar 98 secured to the lower end of the hub of said pulley and engaging the lower surface of the bracket, as shown in Fig. 5. This pulley 96 is splined to the reamer shaft 88 by means of a key 99 engaged within a longitudinal groove formed in the shaft and is in driving connection with the motor 12 through an endless belt 100 and an associated belt pulley 101 on the motor shaft, the reamer shaft being thus connected to the motor for continuous rotation thereby, preferably at a speed of about 700 R. P. M., at which speed excessive aeration of the fruit juice will not ordinarily occur, although there may be a variation of as much as twenty per cent in the speed employed, depending upon the condition and character of the fruit.

The means employed for raising the elevator 76 comprises a lever 102 pivotally connected at its forward end to said elevator by a link 103 and having at its rearmost end a cam roller 104 positioned for engagement by a cam 105 mounted on the cam shaft 20, said lever being loosely pivoted on a rock-shaft 106 journaled in the respective depending brackets 24 and 25. In the present instance I depend upon the weight of the elevator and the mechanism carried thereby for returning such mechanism and elevator to their lowermost positions with the elevator engaging a stop 107 on the track bar 77. However, it will be understood that this mechanism may be positively lowered by an enclosed cam, by spring means, or by other means suitable for the purpose.

As shown in Fig. 3, the juicing mechanism will be elevated to bring the cup 84 in position to directly receive the extruded juice and to position the juicing reamer for upward reciprocation into and out of the orange disposed between the gripping members. Since the juicing reamer B is constantly rotating and may tend to throw the extruded juice outwardly, the cup is provided with a splash ring 108 disposed adjacent the upper edge of the cup to surround the reamer and adapted to closely contact the lower surfaces of the several gripping members 49 and 50 when they are in their inner fruit gripping positions.

It is desirable to provide a yielding mounting for the splash ring 108 in order to insure a substantially fluid-tight engagement thereof with the gripping members without a necessity for great accuracy in the stroke length of the cup travel and to this end said splash ring is provided with diametrically opposite ears 109 carrying depending rods 110, each of which rods being vertically slidable in relatively spaced lugs 111 secured to the inner wall surface of the cup and surrounded by a cushioning compression spring 112 disposed between the respective ear 109 and the adjacent lug 111. To limit upward movement of the splash ring 108 and to permit removal thereof to facilitate cleaning of the cup, I provide opposed leaf-spring stop fingers 113 secured at their lower ends to the cup and engaged over the top rim thereof in position for engagement by the respective ears 109 of the splash ring 108.

After the juice is extruded from an orange, the cup 84 is slightly lowered and the gripping members are separated to release the remaining rind shell which will drop upon the splash ring 108 and be carried downwardly with the juicing mechanism when the elevator is lowered, as shown in Fig. 1. Adjacent the top of the cup 84 when said cup is in its lower position and disposed in position to receive the empty rind shell, is an outwardly and downwardly angled shute 114 mounted upon one of the forward frame uprights, and for the purpose of kicking such empty rind shell into said shute for discharge from the machine there is provided a kicker arm 115 (see Figs. 1 and 4) which is loosely journaled on the lower end of the vertical shaft 58 between two collars fixed on said shaft. This arm 115 is connected by a link 116 to the upper end of an arm 117 secured to the rock-shaft 106 which, as shown in Figs. 4 and 7, is provided with an arm 118 carrying a roller 119 positioned for engagement by a cam 120 secured on the cam shaft 20. An actuating spring 121 extends from the pivot rod 56 to the arm 118 and functions to swiftly operate the kicker arm 115 and its connected parts when the abrupt step of the cam 120 has passed the roller 119 to release the arm 118, the relatively swift swing of the kicker arm 115 across the top of the lowered cup 84 effectively propelling the empty rind shell A² into the receiving shute 114. Subsequently the cam 120 will cam the arm 118 downwardly to restore this kicker mechanism to normal condition.

To prevent the juice receiving cup 84 from rotating in relation to its supporting carriage or elevator 76, it is provided with a laterally projecting clevis bracket 122 which slidably engages an upright guide bar 123 rigidly connected at its lower end to said elevator.

Continuing the description of the operation with respect to the juicing of the fruit (the feeding of the fruit, the gripping thereof and the slicing off of the lower end thereof having heretofore been fully explained) and referring particularly to Figs. 3, 5, 9 and 10 of the drawings, the cam 105 will actuate the lever 102 to raise the elevator 76 and its associated juicing mechanism to the position shown in Fig. 3, at which point the splash ring 108 will engage the closed fruit gripping members and be arrested thereby. Upward movement of the cup 84 will continue until its upper edge engages the lower surfaces of the several horizontal plungers 46 which carry the fruit gripping members and are at this time in their innermost positions. This slight extra elevation of said cup in relation to the arrested splash ring causes compression of the cushioning springs 112 which yieldingly support said ring and which provide a compensating means rendering fine adjustment of the elevator stroke unnecessary. The cup now being in the arrested position shown in Fig. 9, continued upward movement of the elevator will compress the cup supporting spring 86 and will translate the elevator tube 81 upwardly through the tubular core 83 of the cup to elevate the juicing reamer B into the orange, said reamer carrying with it the continuously rotating reamer shaft 88 which slides through and is keyed to the belt pulley 96.

As the revolving reamer enters the sliced end of the orange to break down the pulp body and extrude the fruit juice therefrom, the partitioning carpellary membrane defining the fruit segments or carpels will be ruptured and urged towards the inner rind where the rearwardly flexed reamer ribs 95 will tend to circularly fold them against the inner rind with a relatively soft rubbing action which will expel the fruit juice without squeezing the bitter juices from said membrane and the fruit rind, the unbroken seeds entering the flutes formed by said ribs, as shown in Fig. 10 in which $a$ designates the outer peel or flavedo containing the oil glands, $b$ designating the inner rind containing the vascular bundles, and $c$ designating the carpellary membrane.

As the reamer progresses upwardly into the orange, the fruit juice will flow down between the ribs of the reamer and into the receiving cup 84 and the orange will be pushed upwardly to engage its upper end into the concavity of the cap member 68, as shown in Fig. 9.

Upon completion of the juicing operation, the elevator 76 will be lowered, the first effect being to withdraw the reamer B from the remaining fruit shell until it is returned to its normal position in the cup with the stop ring 82 engaging the upper edge of the tubular core 83 of said cup, the spring 86 expanding but still retaining sufficient tension to maintain the cup in its uppermost position. A short continued downward movement of the elevator will disengage the splash ring 109 from contact with the fruit gripping mechanism which will now be actuated to release the fruit shell. The released fruit shell will drop onto the splash ring 109 after which the elevator and the entire juicing mechanism carried thereby will be lowered to the normal position shown in Fig. 1 to bring the fruit shell A² to a position opposite the upper end of the discharge shute 114.

The cam 120 which normalizes the kicker arm 115 will have by this time reached the position shown in Fig. 7, and will with a slight continued degree of rotation release the arm 118 whereupon the spring 121 will oscillate the rock-shaft 106 and its upright arm 117 to translate the link 116 and swing the kicker arm 115 across the upper end of the cup 84 to kick the fruit shell A² into the shute 114.

The several mechanisms are relatively timed to perform their respective functions in the desired sequence, the apparatus as a whole providing an automatic machine effecting a continuous unit handling of the fruit with complete elimination of human labor and in a manner which will effectively extrude from each fruit unit a maximum percentage of the desired fruit juice and a minimum percentage of the rind oil, the bitter substances and other undesirable elements present in the peel, and in the seeds, the carpellary membrane and the vascular elements of the fruit.

From the foregoing it will be evident that the seeds are not cut or ruptured to release their bitter properties, nor is the rind compressed to release the rind oil, and that by the relatively soft rubbing action of the reamer ribs the carpellary membranes, the vascular bundles and the inner rind are not subject to such squeezing pressure as would release an appreciable amount of their bitter elements. Further, it will be evident that my improved apparatus provides an entirely automatic machine which feeds the fruit singly to a mechanism which holds the fruit against rotation while a spherical segment is sliced therefrom to permit entrance into the fruit of the juicing reamer which immediately functions to extrude the juice without appreciable aeration thereof.

While the apparatus herein illustrated and described is fully capable of fulfilling the objects and purposes primarily stated, it is to be understood that I do not wish to restrict the invention to the specific embodiment herein disclosed, for it is susceptible of embodiment in various other forms, all coming within the scope of the appended claims.

Having thus described my invention, what I claim and desire to secure by Letters Patent is:

1. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, means for actuating said holding means, knife means for slicing a spherical segment from one end of said fruit to provide an opening affording access to the pulp body thereof, means for actuating said knife means, a pliable rotary reaming element generally cylindrical in external contour with its axis axially aligned with the longitudinal axis of the thus compressed fruit and said opening, and reciprocable means for advancing said reaming element into the fruit through said opening to juice the fruit and for subsequently withdrawing said reaming element from the empty fruit shell.

2. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, means for actuating said holding means, knife means operable in a plane intersecting the pulp body of the fruit outwardly from the seed zone thereof to remove a spherical segment from one end of said fruit to provide an opening affording access to the pulp body thereof, means for actuating said knife means, a pliable rotary reaming element generally cylindrical in external contour with its axis axially aligned with the longitudinal axis of the thus compressed fruit and said opening, and reciprocable means for advancing said reaming element into the fruit through said opening to juice the fruit and for subsequently withdrawing said reaming element from the empty fruit shell.

3. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, means for actuating said holding means, knife means for slicing a spherical segment from one end of said fruit to provide an opening affording access to the pulp body thereof, means for actuating said knife means, a pliable rotary reaming element generally cylindrical in external contour with its axis axially aligned with the longitudinal axis of the thus compressed fruit and said opening, and reciprocable means for advancing said reaming element into the fruit through said opening to juice the fruit and for subsequently withdrawing said reaming element from the empty fruit shell, said reaming element rupturing the juice sacs of the fruit and engaging the inner rind and adhering carpellary membrane with a squilgee wiping action during the juicing operation.

4. In an apparatus of the character disclosed, the combination of a fruit holding and compressing means comprising opposed gripping members disposed about a common center and translatable towards each other to receive a citrus fruit and compress the same to the form of a substantially cylindrical body of predetermined diameter with substantially semi-spherical ends and hold the citrus fruit against rotation during a juicing operation and reversely translatable to subsequently release the empty fruit shell, means for translating said gripping members, knife means for slicing a spherical segment from one end of the fruit to provide an opening affording access to the pulp body thereof, means for actuating said knife means, a pliable rotary reaming element generally cylindrical in external contour with its axis axially aligned with the longitudinal axis of the thus compressed fruit and said opening, and reciprocable means for advancing said reaming element into the fruit through said opening to juice the fruit and for subsequently withdrawing said reaming element from the empty fruit shell.

5. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation comprising opposed arcuate gripping members operable to circularly embrace and compress the fruit for a juicing operation and to subsequently release the empty fruit shell, means for actuating said gripping members, knife means for slicing a spherical segment from one end of the elongated fruit to provide an opening affording access to the pulp body thereof, means for actuating said knife means, a pliable rotary reamer generally cylindrical in external contour with its axis axially aligned with the longitudinal axis of the thus compressed fruit and said opening, and reciprocable means for advancing said reamer into the fruit through said opening to juice the fruit and for subsequently withdrawing said reamer from the empty fruit shell.

6. In an apparatus of the nature disclosed, the combination of a fruit holding means operable to hold a citrus fruit against rotation comprising opposed arcuate gripping members operable to circularly embrace and compress the fruit to slightly elongated form for a juicing operation and to subsequently release the empty fruit shell, means for actuating said gripping members, knife means for slicing a spherical segment from an end of the elongated fruit to provide an opening affording access to the pulp body thereof, means for actuating said knife means, a rotary reamer axially aligned with the fruit and said opening and provided with pliable longitudinal ribs circularly spaced to provide intermediate seed receiving flutes and projecting radially to a diameter slightly greater than the internal cylindrical diameter of the fruit rind so as to flex rearwardly relative to the direction of rotation and have a squilgee wiping action against the inner rind and adhering carpellary membrane during the juicing operation, and reciprocable means for advancing said reamer into the fruit through said opening to juice the fruit and for subsequently withdrawing said reamer from the empty fruit shell.

7. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, means for actuating said holding means, knife means operable in a plane intersecting the pulp body of the fruit outwardly from the seed zone thereof to remove a spherical segment from one end of the fruit and provide an opening affording access to said pulp body, means for actuating said knife means, a rotary reamer generally cylindrical in external contour with its axis axially aligned with the longitudinal axis of the thus compressed fruit and said opening and having pliable longitudinal ribs circularly spaced to provide intermediate seed receiving flutes, and reciprocable means for advancing said reamer into the fruit through said opening to juice the fruit and for subsequently withdrawing said reamer from the empty fruit shell.

8. In an apparatus of the nature disclosed, the combination of a fruit holding means operable to hold a citrus fruit against rotation during a juicing operation and to subsequently release the empty fruit shell, means for actuating said holding means, knife means operable in a plane intersecting the pulp body of the fruit outwardly from the seed zone thereof to remove a spherical segment and provide an opening affording access to said pulp body, means for actuating said knife means, a rotary reamer axially aligned with the fruit and said opening and having pliable longitudinal ribs slightly spiralled and circularly spaced to provide intermediate seed receiving flutes, and reciprocable means for advancing said reamer into the fruit through said opening to juice the fruit and for subsequently withdrawing said reamer from the empty fruit shell.

9. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, means for feeding fruit singly to said holding means, means for actuating said holding means, knife means for slicing a spherical segment from one end of said fruit to provide an opening affording access to the pulp body thereof, means for actuating said knife means, a pliable rotary reaming element generally cylindrical in external contour with its axis axially aligned with the longitudinal axis of the thus compressed fruit and said opening, and reciprocable means for advancing said reaming element into the fruit through said opening to juice the fruit and for subsequently withdrawing said reaming element from the empty fruit shell.

10. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, conveyer means for propelling fruit to said holding means and associated control means for insuring a unit feed of said fruit to the holding means, means for actuating said holding means, knife means for slicing a spherical segment from one end of said fruit to provide an opening affording access to the pulp body thereof, means for actuating said knife means, a pliable rotary reaming element generally cylindrical in external contour with its axis axially aligned with the longitudinal axis of the thus compressed fruit and said opening, and reciprocable means for advancing said reaming element into the fruit through said opening to juice the fruit and for subsequently withdrawing said reaming element from the empty fruit shell.

11. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, means for actuating said holding means, knife means for slicing a spherical segment from one end of said fruit to provide an opening affording access to the pulp body thereof, means for actuating said knife means, a pliable rotary reaming element generally cylindrical in external contour with its axis axially aligned with the longitudinal axis of the thus compressed fruit and said opening, and reciprocable means for advancing said reaming element into the fruit through said opening to juice the fruit and for subsequently withdrawing said reaming element from the empty fruit shell, and an ejector adapted to engage and eject the empty fruit shell.

12. In an apparatus of the nature disclosed, the combination of a fruit holding and compressing means operable to receive a citrus fruit and compress the same to the form of a substantially cylindrical body of predetermined diameter with substantially semi-spherical ends and hold the citrus fruit against rotation during a juicing operation and to subsequently release the empty fruit shell, means for actuating said holding means, knife means for slicing a spherical segment from one end of said fruit to provide an opening affording access to the pulp body thereof, means for actuating said knife means, a pliable rotary reaming element generally cylindrical in external contour with its axis, axially aligned with the longitudinal axis of the thus compressed fruit and said opening, and reciprocable means for advancing said reaming element into the fruit through said opening to juice the fruit and for subsequently withdrawing said reaming element from the empty fruit shell, and a traveling receptacle operable by said reciprocable means to and from a position to receive the extruded fruit juice.

13. A fruit juicing reamer comprising a cylindrical body having pliable longitudinally disposed radially extended ribs circularly spaced to provide intermediate flutes and adapted to flex rearwardly relative to the direction of rotation of the reamer.

RALSTON R. SMITH.